United States Patent

Holbrook et al.

[11] 3,721,331
[45] March 20, 1973

[54] SIDE DISCHARGE BELT CONVEYOR ASSEMBLY

[75] Inventors: Franklin K. Holbrook, Whittier; Donn J. Rickard, Glendora, both of Calif.

[73] Assignee: Brown International Corporation, Covina, Calif.

[22] Filed: Oct. 23, 1970

[21] Appl. No.: 83,366

[52] U.S. Cl..................................198/66, 198/188
[51] Int. Cl..........................B65g 15/00, B65g 47/26
[58] Field of Search........198/42, 66, 188, 31 AC, 38

[56] References Cited

UNITED STATES PATENTS

| | | | |
|---|---|---|---|
| 1,804,154 | 5/1931 | Cowley | 198/38 |
| 1,923,753 | 8/1933 | Scofield | 198/31 AC |
| 856,993 | 6/1907 | Teague | 198/188 |
| 3,241,650 | 3/1966 | Horton | 198/188 X |
| 2,642,980 | 6/1953 | Soucek | 198/66 |

Primary Examiner—Edward A. Sroka
Attorney—Lyon & Lyon

[57] ABSTRACT

A side discharge belt conveyor assembly for fragile articles such as grapefruit sections employs three flat parallel conveyor belts all moving in the same direction, and having lateral spaces between adjacent side edges. Diverter blades are pivotally supported in close proximity to the upper surfaces of the belts in order to sweep the fragile articles laterally off all the side edges of the belts at predetermined locations, thereby minimizing the extent of required lateral travel of the fragile articles. Two oppositely-movable diverter blades above each side belt are connected to one diverter blade above a side portion of the wide center belt for simultaneous movement in unison between inoperative longitudinal positions and operative slanted positions. A deflector and additional pivoted blades are provided for diverting broken grapefruit sections from the central portion of the wide center belt to transverse discharge chutes at predetermined locations.

7 Claims, 5 Drawing Figures

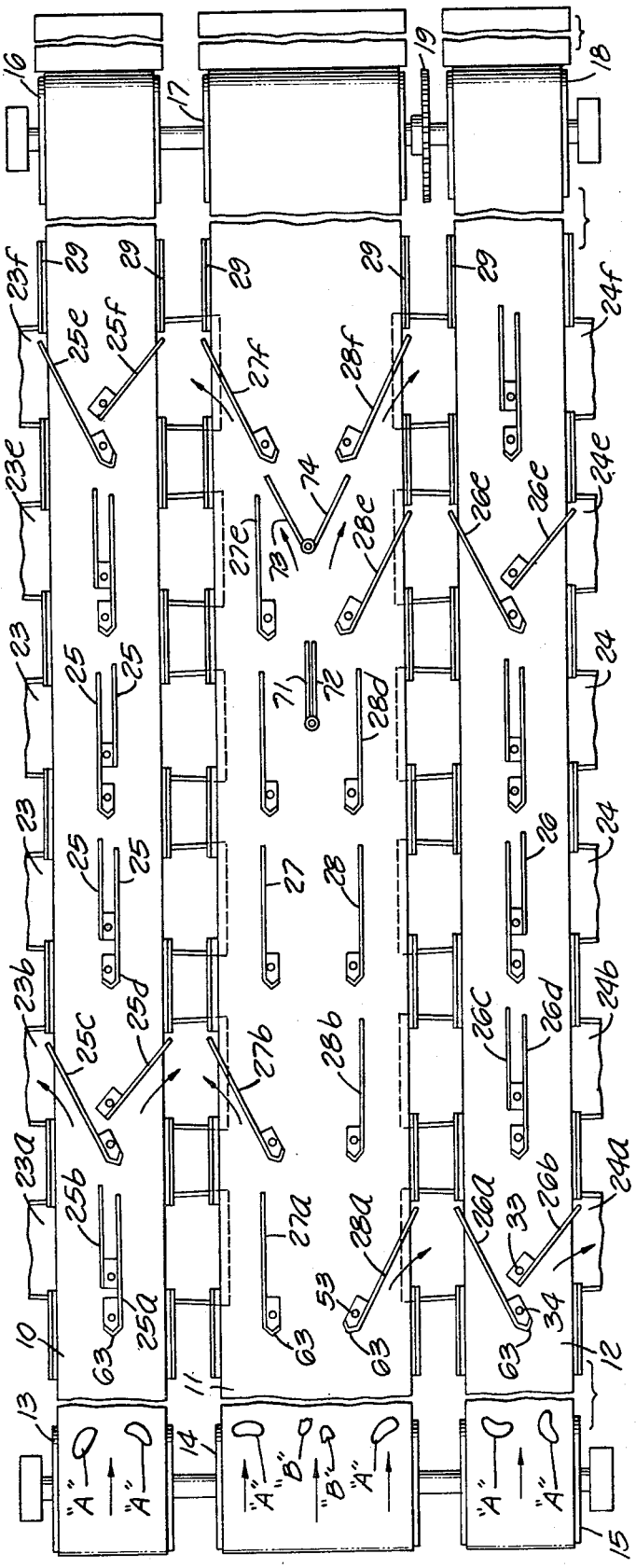
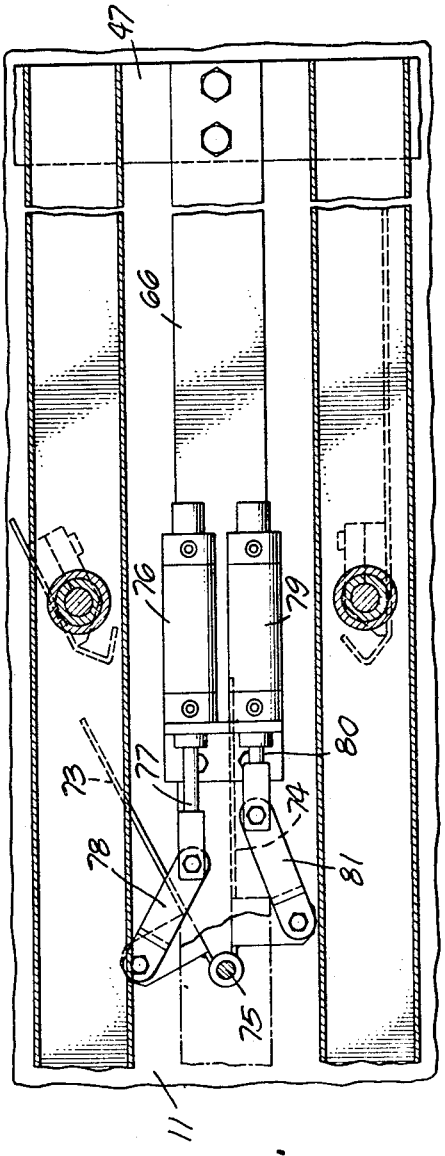

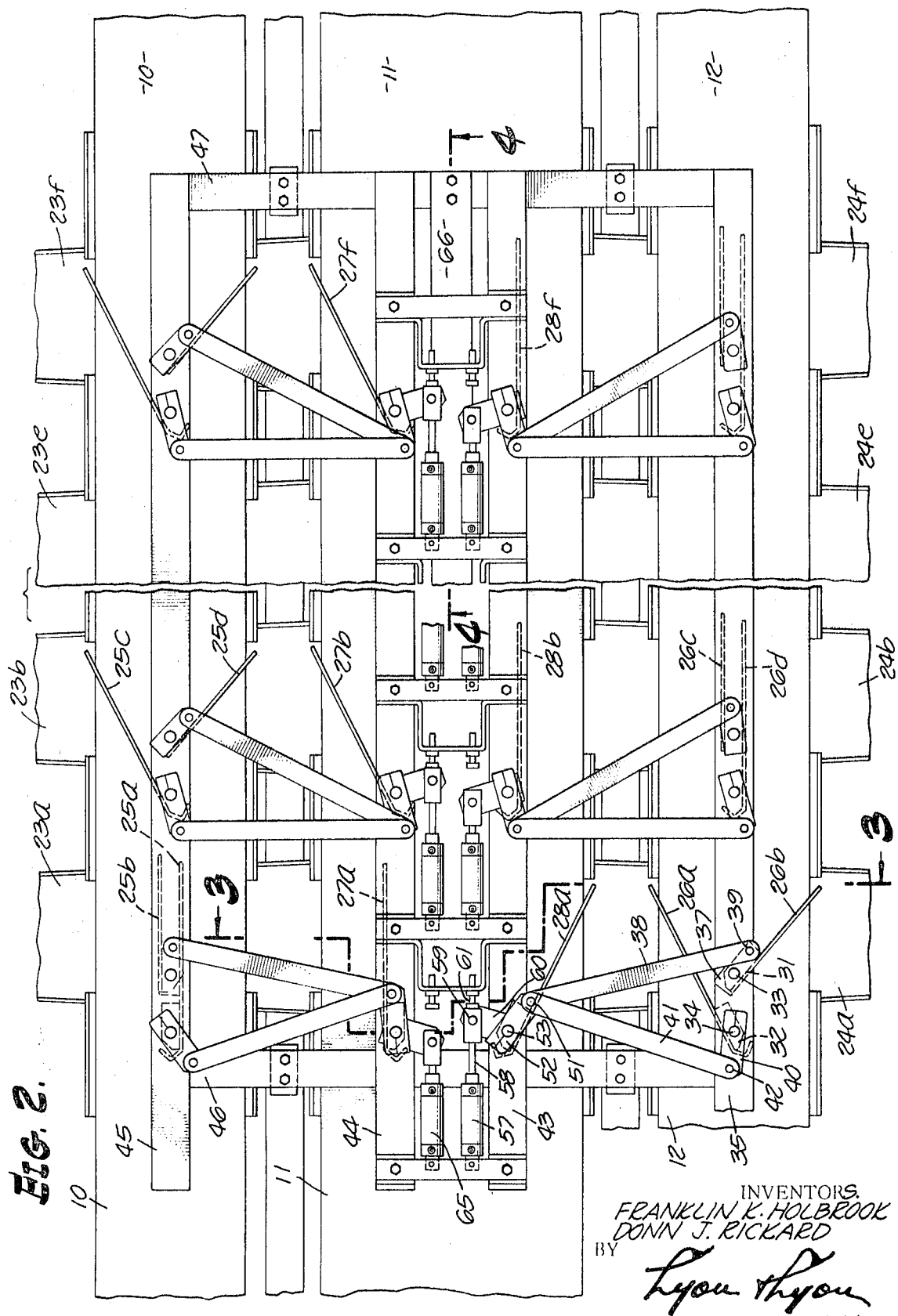

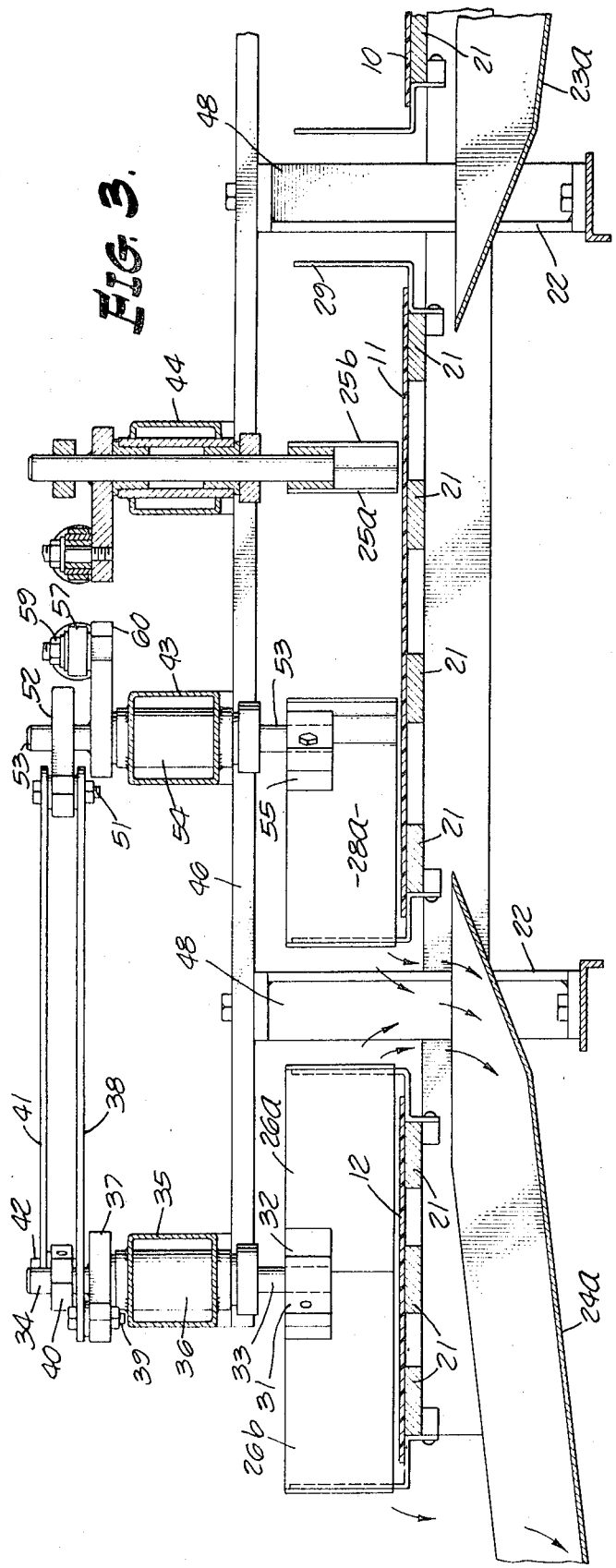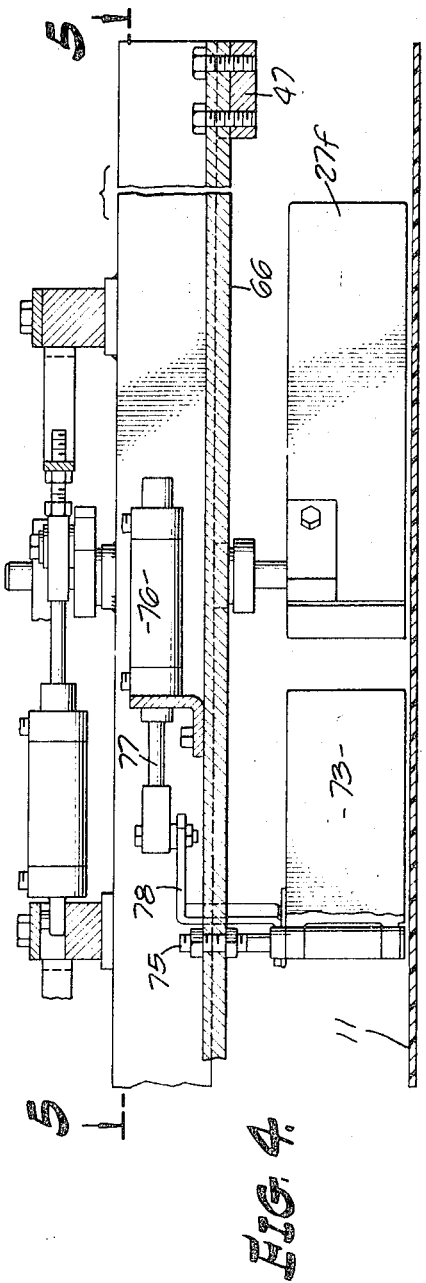

SIDE DISCHARGE BELT CONVEYOR ASSEMBLY

This invention relates to side discharge belt conveyor apparatus for handling fragile articles such as grapefruit sections. It is highly desirable to minimize scuffing and abrasion of such fragile articles in course of delivery to container filling apparatus. Therefore, it is an important object of our invention to provide conveyor apparatus for distributing such fragile articles to container filling stations with a minimum amount of damage.

At one time in commercial operations grapefruit sections were manually removed from the fruit and manually placed in containers, but this manual process has been found to be time-consuming and expensive. Apparatus for sectionizing grapefruit and other citrus fruits is shown in the copending application of Bushman et al. Ser. No. 873,850, filed Nov. 4, 1969 and entitled "Means for Sectionizing Citrus Fruit" now U.S. Pat. No. 3,643,716 granted Feb. 22, 1972. The apparatus of the present invention is intended to receive spherical wedge grapefruit sections, as well as broken sections, and to deliver them to a plurality of stations for automatic can filling operation, all with a minimum requirement of manual handling, and with minimum damage.

In accordance with the invention, a plurality of flat parallel conveyor belts all moving in the same direction cooperate with selectively operable diverter blades for sweeping grapefruit sections off side edges of the belts at predetermined locations. The diverter blades are movable from a longitudinal inoperative position to a slanted operative position, and each is connected for operation in unison with other diverter blades. The container filling mechanisms which are fed by the side discharge belt conveyor assembly operate "on demand," without any requirement of the order in which containers are filled at the various stations. Accordingly, the discharge chutes which receive the grapefruit sections from the side edges of the conveyor belts are also fed "on demand." Thus, there is no predetermined order of filling of the discharge chutes, as the device continues in operation. The diverter blades swing between fully retracted inoperative position to fully slanted operative position, without stopping at any intermediate position.

Other objects and advantages will appear hereinafter.

In the drawings:

FIG. 1 is a diagrammatic plan view partly broken away and certain parts being omitted for clarity of illustration, showing a preferred embodiment of this invention.

FIG. 2 is a plan view partly broken away, similar to FIG. 1 but showing mechanism for moving the diverter blades.

FIG. 3 is a transverse sectional elevation taken substantially on the lines 3—3 as shown in FIG. 2.

FIG. 4 is a longitudinal sectional elevation taken substantially on the lines 4—4 as shown in FIG. 2.

FIG. 5 is a sectional plan view taken substantially on the lines 5—5 as shown in FIG. 4.

Referring to the drawings, three parallel endless belts 10, 11 and 12 are trained over coaxial pulleys 13, 14, 15 and 16, 17, 18. A drive sprocket 19 serves to turn the pulleys to cause the belts 10, 11 and 12 to move in the same direction. As shown in FIG. 3, the upper reach of each belt is supported in a flat horizontal position by means of longitudinally extending stationary guide bars 21, each having a smooth upper surface for sliding contact with one of the belts. The guide bars 21 are each carried on a stationary frame 22. The belts are laterally spaced, so that fragile articles such as grapefruit sections can be discharged laterally over the side edges of the belts and into the spaces between the belts. Discharge collector chutes 23 and 24 extend transversely of the length of the belts and project between the upper and lower reaches thereof. Each chute 23 projects under the upper reach of the side belt 10 and under the space between the belts 10 and 11. Similarly, each of the chutes 24 projects under the upper reach of the side belt 12 and under the space between the belt 12 and the belt 11. Each of the chutes 23 and 24 leads to container filler apparatus, not shown. Such apparatus is shown in a copending application of Donn J. Rickard Ser. No. 83,390 and Donn J. Rickard et al. Ser. No. 83,389, both filed of even date herewith.

In the general plan of operation, fragile articles such as grapefruit sections "A" are deposited by means not shown on each of the belts 10, 11 and 12 at the entry end near the pulleys 13, 14 and 15. These grapefruit sections are carried along the upper surface of the belts until they reach a diverter blade in slanted position which causes them to be moved laterally off the side edge of the belt and into one of the discharge chutes. Also, broken grapefruit sections "B" are deposited on the central portion of the inlet end of the center belt 11, and these broken sections travel on the upper surface of the moving belt 11 until they strike a central deflector which moves them to one side or the other of the moving belt 11. In this way the broken sections bypass most of the discharge chutes 23 and 24 and are deposited only in the discharge chute or chutes near the far end of the belt conveyors nearest the pulleys 16, 17 and 18.

Several longitudinal series of movable diverter blades are mounted above and in close proximity to the upper surfaces of the moving belts 10, 11 and 12. The diverter blades 25 in the first series are positioned centrally above the conveyor belt 10, the diverter blades 26 in the second series centrally above the conveyor belt 12, the third series of diverter blades 27 along one side portion of the center belt 11, and the fourth series of diverter blades 28 along the other side portion of the center belt 11. The diverter blades 27 and 28 above the center belt 11 are mounted in a longitudinal series of adjacent pairs. The diverter blades 25 above the belt 10 and the diverter blades 26 above the belt 12 are each mounted in pairs, one moving clockwise and the other counterclockwise. Each diverter blade is mounted to swing about a vertical axis from an inoperative longitudinal position in which blades 25a and 25b are shown, to an angled operative position in which blades 25c and 25d are shown. Side rail sections 29 are mounted on the stationary frame parts along the side edges of the belts between the locations of the discharge chutes 23 and 24. Since the pairs of diverter blades in the first series over the belt 10 and the second series over the belt 12 are substantially duplicates, a detailed description of one pair will suffice. Thus, as best shown in FIGS. 2 and 3, the diverter blades 26a and 26b each comprises a thin rectangular metal plate each having a support block 31, 32 fixed in one upper corner thereof. A vertical pivot pin 33 is fixed to the block 31 and supports the diverter blade 26b. Similarly, a vertical pivot pin 34 is fixed to the pivot block 32 and supports the diverter blade 26a. The stationary longitudinal frame member 35 carries bearing housings 36 which pivotally support each of the pivot pins 33 and 34. The upper end of the pivot pin 33 projects above the bearing housing 36 and is fixed to crank arm 37 operated by link 38 through pin 39. Similarly, the pivot pin 34 projects above its bearing housing 36 and is fixed to crank arm 40 operated by link 41 through pin 42.

The longitudinal members 35, 43, 44 and 45 of the stationary frame 22 are supported on spaced transverse members 46 and 47, and these in turn are supported on posts 48 which project through the spaces between the belts 10 and 11 and between the belts 11 and 12.

The links 38 and 41 are operated by a single pin 51 carried on the crank arm 52 fixed to the upper end of the pivot pin 53. This pivot pin 53 is supported in the stationary upright housing 54 on the longitudinal frame member 43, and the lower end of this pin 53 is fixed to the diverter blade 28a by means of block 55. Means are provided for swinging the diverter blades 26a, 26b and 28a in unison from the same power source, and as shown in the drawings, this means includes the double acting power cylinder assembly 57 having piston rod 58 pivotally connected at 59 to crank arm 60. This crank arm 60 is fixed to the pivot pin 53. An adjustable stop 61 is provided for limiting the outward stroke of the piston rod 58. From this description it will be understood that the power cylinder assembly 57 operates the crank arm 60 to swing the vertical pivot pin 53 and the diverter blade 28a which is attached to it. This power cylinder assembly 57 also simultaneously swings the diverter blades 26a and 26b by means of the links 38 and 41 and pivot pins 34 and 33, respectively. The diverter blades 26a, 26b and 28a simultaneously move between the angled discharge position shown in the drawings to an inoperative longitudinal position similar to that occupied by diverter blades 25a, 25b and 27a. It will be observed that grapefruit sections "A" diverted and swept off the side edges of the belts 11 and 12 by blades 28a, 26a and 26b are all received by the same discharge chute 24a. Similarly, the diverter blades 27b, 25d and 25c all discharge into the same chute 23b. In a similar manner, the power cylinder assembly 65 simultaneously operates diverter blades 25a, 25b and 27a to divert grapefruit sections "A" into the transverse chute 23a. Similarly, diverter blades 25c, 25d and 27b are operated simultaneously to divert grapefruit sections into the chute 23b, and diverter blades 26c, 26d and 28b are operated simultaneously to divert grapefruit sections into the discharge chute 24b. The diverter blades feeding the other discharge chutes are similarly operated.

The upstream diverter blade in each pair in the series overlying the belt 10 and in the series overlying the belt 12, as well as all of the diverter blades overlying the belt 11, are provided with a pointed end portion 63 which separates the flow of grapefruit sections so that the individual sections pass on one side or the other of the series of diverter blades.

In operation, grapefruit sections "A" of spherical wedge shape are deposited on the upper surfaces of the left-hand ends of the belts 10, 11 and 12, as viewed in FIG. 1. Broken grapefruit sections "B" are placed near the central portion of the wide belt 11, near the left-hand end. With the diverter blades and deflector 65 positioned as shown in the drawings, grapefruit sections "A" are discharged laterally from both side edges of the belt 10 into the transverse discharge chute 23b. Similarly, grapefruit sections on the edge portion of the wide belt 11 nearest the belt 10 are swept laterally by the diverter blade 27b into the same discharge chute 23b. It is to be noted that the maximum lateral travel required of any grapefruit section is one-half the width of the narrow belt 10 or 12. This minimizes scuffing and frictional contact with the grapefruit sections and thereby minimizes damage to them. Grapefruit sections are also discharged laterally off side edges of the belt into chute 24a by diverter blades 28a, 26a and 26b. Diverter blades 28e, 26e and 26f are in slanted position to divert grapefruit sections into the discharge chute 24e, as soon as grapefruit sections arrive on the belts 11 and 12, following return of the diverter blades 28a, 26a and 26b to inoperative longitudinal position. Similarly, diverter blades 25e, 25f and 27f are in position to divert grapefruit sections into the discharge chute 23f as soon as all diverter blades upstream are moved to inoperative position so that grapefruit sections may reach the last station on the machine. Means, not shown, are provided for energizing the power cylinder assemblies to swing the diverter blades in accordance with demand of the filling apparatus fed by the particular discharge chute. This occurs, not in any predetermined sequence, but "on demand" as fruit is needed at any one of the filling stations.

With the pivoted blades in the position shown in the drawings, broken grapefruit sections "B" are caused to be swept laterally by pivoted blades 73 and 27f for lateral discharge into the chute 23f, and by pivoted blades 74 and 28f for lateral discharge into the chute 24f.

Having fully described out invention, it is to be understood that we are not to be limited to the details herein set forth but that our invention is of the full scope of the appended claims.

We claim:

1. In a side discharge belt conveyor assembly for fragile articles such as grapefruit sections, the combination of: parallel laterally spaced belts, each of the belts having upper reach portions supported in flat horizontal position, means for driving said belts in the same direction, diverter blades pivotally supported in close proximity to said upper reaches of said belts, certain of said diverter blades being mounted in pairs above the center of one of the belts, others of said diverter blades being mounted above an adjacent belt, each of said blades being movable from an inoperative longitudinal position to an operative slanted position to sweep articles laterally off a side edge of one of the belts at a predetermined location, and means interconnecting the diverter blades in each pair above the first said belt with one of the blades above said adjacent belt for movement in unison between operative and inoperative positions.

2. The combination set forth in claim 1 in which a stationary support structure is positioned above said belts, said diverter blades being pivotally mounted on said support structure, and selectively operable power means on said support structure for moving said diverter blades.

3. In a side discharge belt conveyor assembly for fragile articles such as grapefruit sections, the combination of: a center belt positioned between and spaced laterally from two side belts, the center belt being wider than the side belts and parallel thereto, each of the belts having upper reach portions supported in flat horizontal position, means for driving all three belts in the same direction, diverter blades pivotally supported in close proximity to said upper reaches of said belts, certain of said diverter blades being mounted in pairs above the center of said side belts, respectively, others of said diverter blades being mounted in laterally spaced pairs above said center belt, each of said blades being movable from an inoperative longitudinal position to an operative slanted position to sweep articles laterally off a side edge of one of said belts at a predetermined location, and means interconnecting the diverter blades in each pair above the side belts with one of the laterally spaced diverter blades above the center belt for movement in unison between operative and inoperative positions.

4. In a side discharge belt conveyor assembly for fragile articles such as grapefruit sections, the combination of: a center belt positioned between and spaced laterally from two side belts, the center belt being wider than the side belts and parallel thereto, each of the belts having upper reach portions supported in flat horizontal position, means for driving all three belts in the same direction, diverter blades pivotally supported in close proximity to said upper reaches of said belts and each being movable from an inoperative longitudinal position to an operative slanted position to sweep articles laterally off a side edge of one of said belts at a predetermined location, said diverter blades including a first series mounted above the center of one of the side belts, and a second series mounted above the center of the other of the side belts, the diverter blades including a third series mounted above one side portion of the center belt and a fourth series mounted above the other side portion of the center belt, and means interconnecting each diverter blade above the side belts with a diverter blade above an adjacent side portion of the center belt for movement in unison between operative and inoperative positions.

5. In a side discharge belt conveyor assembly for fragile articles such as grapefruit sections, the combination of: a conveyor belt having an upper reach supported in flat horizontal position and having parallel side edges, means for driving said belt, a longitudinal series of adjacent pairs of diverter blades positioned in close proximity to said upper reach of the conveyor belt, means above said upper reach for pivotally supporting each pair of said diverter blades so that each blade is movable from an inoperative longitudinal position to an operative slanted position to sweep articles laterally off a side edge of the conveyor belt, and separate means for moving each of said diverter blades between its operative and inoperative positions, whereby articles may be selectively diverted over either one or both side edges of the belt at a single predetermined location along the conveyor belt or allowed to pass to the next pair of diverter blades in the series.

6. The combination set forth in claim 5 in which a stationary support structure is positioned above said conveyor belt, said diverter blades being pivotally mounted on said support structure, and selectively operable power means on said support structure for moving said diverter blades.

7. The combination set forth in claim 5 in which each diverter blade sweeps less than one-half of the width of the conveyor belt.

* * * * *